Figure 1:
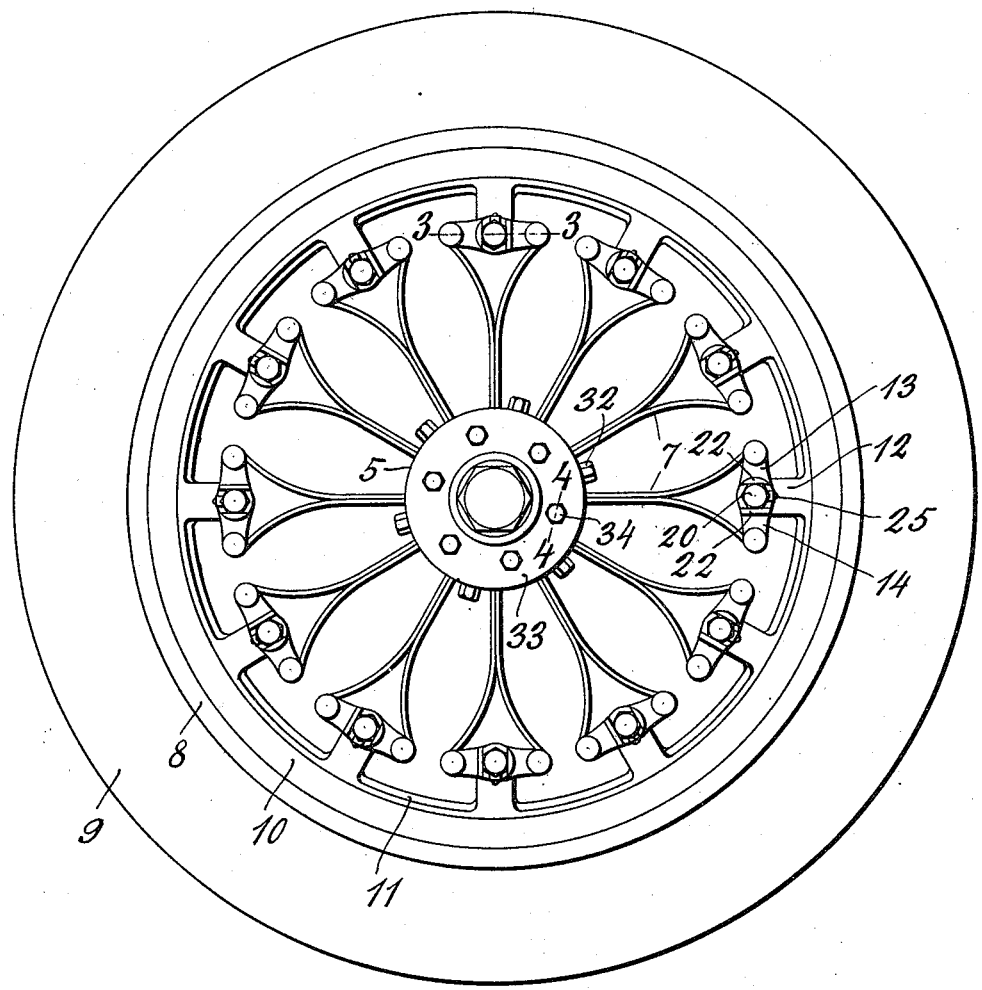

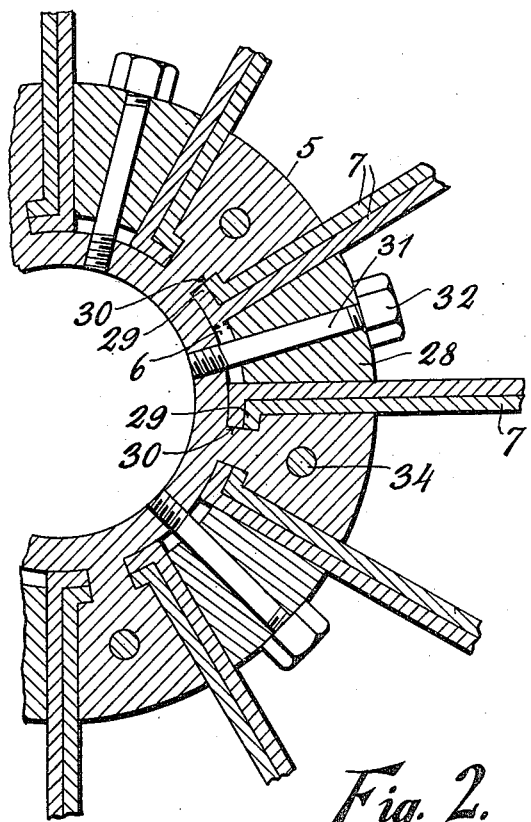
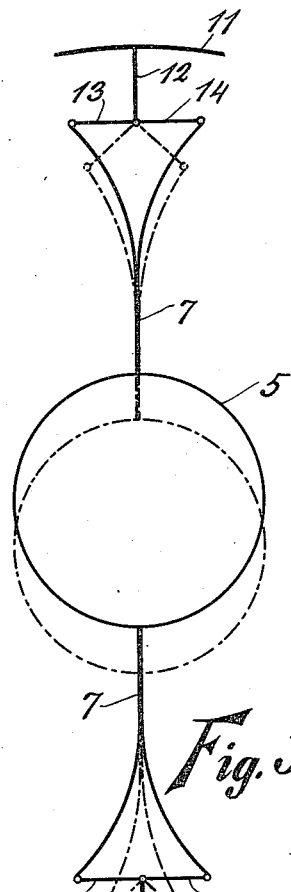
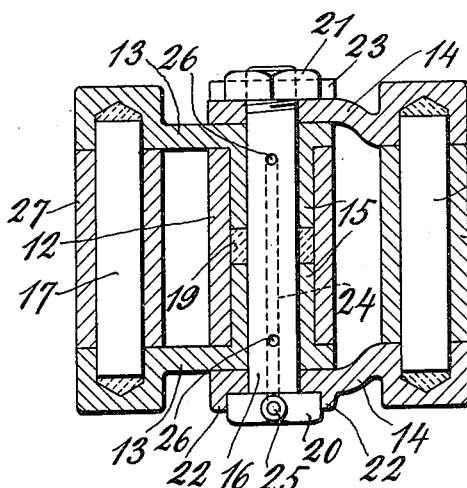
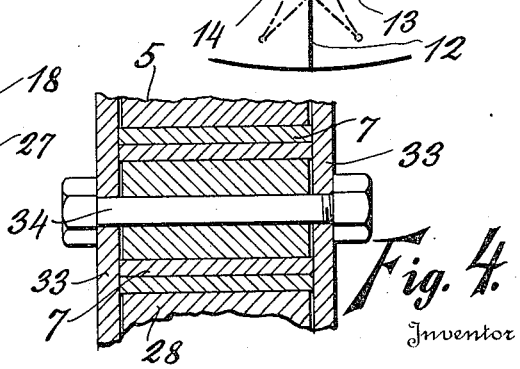

UNITED STATES PATENT OFFICE.

GEORG V. STEIN, OF INDIANAPOLIS, INDIANA, ASSIGNOR TO PERFECTION SPRING WHEEL COMPANY, OF INDIANAPOLIS, INDIANA.

RESILIENT WHEEL.

1,151,302.          Specification of Letters Patent.          Patented Aug. 24, 1915.

Continuation of application Serial No. 823,119, filed March 7, 1914. This application filed November 16, 1914. Serial No. 872,362.

*To all whom it may concern:*

Be it known that I, GEORG V. STEIN, a citizen of the United States, residing at Indianapolis, in the county of Marion and State of Indiana, have invented certain new and useful Improvements in Resilient Wheels, of which the following is a specification.

This invention relates to that class of resilient wheels which are provided with spring spokes, which latter normally maintain the rim and the hub in concentric relation, and which yield when the rim and the hub become eccentric upon passing over an obstacle or when an excessive weight is placed on the wheel.

It is the object of the present invention to provide a simple, strong and durable wheel of the kind stated, and a novel construction and arrangement of spring spokes as will be hereinafter described in detail and claimed.

The present application is a continuation of the application filed March 7, 1914, Serial Number 823119.

In order that the invention may be better understood, reference is had to the accompanying drawing in which—

Figure 1 is an elevation of the wheel; Fig. 2 is a sectional detail showing the attachment of the spokes to the hub; Fig. 3 is an enlarged section on the line 3—3 of Fig. 1; Fig. 4 is an enlarged cross-section on the line 4—4 of Fig. 1, and Fig. 5 is a diagram illustrating the action of the spokes.

Referring specifically to the drawings, the hub of the wheel carries a spoke securing member comprising a sleeve 5 having at regular intervals radial recesses 6 opening through its periphery, and forming seats for the inner ends of the spokes 7. The wheel has an ordinary outer rim 8 carrying a rubber or other tire or tread 9. This rim is mounted on an intermediate wooden rim 10, and the latter is in turn mounted on an inner rim 11 having at regular intervals lugs 12 carrying links 13 and 14, respectively, to which the outer ends of the spokes are connected as will be presently described. The rim 10 is employed for the purpose of taking up any vibration set up in the outer rim 8.

The links 13 and 14 are arranged in laterally spaced pairs. As shown in Fig. 3, the links 13 have hub portions 15 at their inner ends to receive a pivot bolt 16, and they are spaced laterally and have seats at their outer ends for a cross pin 17. The links 14 are mounted at their inner ends directly on the pivot bolt, and their outer ends have seats for a cross pin 18. The lug 12 has a transverse opening to receive the hub portions 15 of the links 13, the same entering the opening from opposite sides. The hub portions provide a wide bearing for the links 13, and the length of the said hub portions is such that a space 19 is left between their inner ends which is packed with a lubricant such as graphite or grease. The pins 17 and 18 do not fill their seats in the links in order that a lubricant packing may also be applied. The pivot bolt 16 has a head 20 at one end, and on its other end is screwed a nut 21. One of the links 14 is between the bolt head and the adjacent link 13, and the other one of the links 14 is between the nut and the adjacent link 13, said links 13 being thus inside the links 14. On the outer face of the link 14 which is behind the bolt head are outstanding, spaced and parallel ribs 22 between which the bolt head seats, whereby the bolt is prevented from rotating relative to the links 14. The nut 21 is locked on the bolt by a cotter pin 23. In the bolt is a central lubricant conduit 24 leading from an oil cup 25 carried by the head 20, and having branch ducts 26 opening through the side of the bolt.

Each spoke 7 comprises a pair of flat or leaf springs placed back to back for a portion of their length, and connected at their inner ends to the hub member 5. The outer ends of the springs diverge by being bowed outward in opposite directions, and one of said springs is connected to the pin 17, whereas the other spring is connected to the pin 18, the connection being made by forming the ends of the springs into eyes 27 to receive the pins. Thus, the springs are connected to the links 13 and 14, and as the latter extend in opposite directions and the springs are connected to the outer ends of the links, the latter are located between the outer bowed ends of the springs.

The inner ends of the spokes extend into the recesses 6 in the hub member 5, a pair of spokes extending into each recess and being clamped therein by a wedge block 28. The recess tapers inward and the spokes seat against the opposite end walls of recess, with the wedge block between the spokes, so that when said wedge block is driven inward, the spokes are securely clamped. The inner ends of each pair of springs forming a spoke have lateral bends 29 which lap and extend into a recess 30 in the end wall of the recess 6 at the inner end thereof, whereby the spoke is securely held against displacement outward as well as inward in the direction of its length. The member 5 carries radially extending pins or bolts 31 which extend into the recesses 6. The wedge blocks have central apertures through which these pins pass, and on the outer ends of the latter are screwed nuts 32, whereby the wedge blocks are fastened in holding position in the recesses. It will be noted that the depth of the recesses is greater than the length of the wedge blocks, which allows the latter to be adjusted inward to take up wear. On opposite sides of the member 5 are located annular plates 33 secured by cross bolts 34 passing through said parts. These plates close up the recesses 6 at the sides of the member 5 and thus prevent lateral displacement of the spokes. The spokes can be made slightly wider than the member 5 in order that they may seat tightly between the plates 33. The member 5 may be applied to an ordinary wheel hub after removing the spoke ring thereof and the spokes.

The bowed ends of the springs have a maximum spread or divergence under normal loads, the link pairs 13 and 14 then being in alinement and standing out straight from the lugs 12, and the hub and the rim of the wheel being concentric. The springs will be of such strength and tension that the wheel rim, under ordinary loads, is held in this position. This tension may be varied according to the load the wheel is to bear. When the wheel meets an obstruction, the radius from the hub to that portion of the rim in contact with the ground is reduced, and the radius from a diametrically opposite point on the rim to the hub is correspondingly increased. In other words, the hub lowers and becomes eccentric to the rim. This also happens when an extra load is placed on the wheel. This relative movement of the hub and the rim is cushioned by the springs. The links 13 and 14 at the bottom swing outward toward the rim and the links 13 and 14 at the top swing inward toward the hub. This change in the position of the links decreases the distance between the outer ends thereof, and the bowed ends of the springs are drawn toward each other as shown dotted in Fig. 5. The parts go back to their normal position, shown in full lines, as soon as the obstruction is passed, or the abnormal load is removed. All the springs are brought into play, the degree of distortion being directly proportionate to the displacement of the hub relative to the rim. The wheel runs easy as the tread remains a true circle and is not deformed as is the case in wheels having a pneumatic tire or a deformable rim which flatten at the point of contact with the ground. When a spring is bent, its concave side is under compression and its convex side under expansion. Obviously, these stresses increase with the thickness of the spring, and hence the greater liability of a thick spring becoming crystallized. By arranging the springs in pairs as shown and described, relatively thin springs may be employed and the tendency to crystallization is therefore reduced to a minimum, and at the same time the springs are strong enough to carry the load.

I claim:

1. A wheel comprising a hub, a rim, and spokes therebetween, said spokes comprising flat springs placed back to back in pairs, the inner ends of the pairs being secured to the hub, and the members of the pairs being bowed outward in opposite directions at their outer ends, and in contact with each other from the hub to said bowed portions, and oppositely extending pivoted links carried by the rim between the bowed outer ends of the aforesaid members, and connected respectively to said ends.

2. A wheel comprising a hub, a rim having lugs on its inner side, and spokes extending between the hub and the rim, said spokes comprising flat springs placed back to back in pairs, the inner ends of the pairs being secured to the hub, and the members of the pairs being bowed outward in opposite directions at their outer ends, and in contact with each other from the hub to said bowed portions, and oppositely extending links pivotally connected to the lugs of the rim between the bowed outer ends of the aforesaid members, and connected respectively to said ends.

3. A wheel comprising a hub, a rim, spokes connecting the hub and the rim, said spokes comprising flat springs placed back to back in pairs, the inner ends of the pairs being secured to the hub, and the members of the pairs being bowed outward in opposite direction at their outer ends, and in contact with each other from the hub to said bowed portions, lugs carried by the rim and having a transverse opening, laterally spaced links having hub portions seating in the transverse openings, pivot bolts passing through the hub portions, laterally spaced links mounted on the pivot bolts, and extending in the opposite direction from the first-mentioned links, and cross pins carried by the outer ends of the links to which cross pins the outer ends of the springs are connected.

In testimony whereof I affix my signature in presence of two witnesses.

GEORG V. STEIN.

Witnesses:
 CARRIE M. JOHNSON,
 LILLIAN LOFTUS.

Copies of this patent may be obtained for five cents each, by addressing the "Commissioner of Patents, Washington, D. C."